United States Patent [19]
Danz et al.

[11] Patent Number: 4,763,057
[45] Date of Patent: Aug. 9, 1988

[54] CONTROL FOR IMPROVING INDUCTION TRANSIENT RESPONSE BY EXCITATION ANGLE CONTROL

[75] Inventors: George E. Danz, Radford; C. Calvin Shuler, Salem, both of Va.

[73] Assignee: Kollmorgen Technologies Corporation, Dallas, Tex.

[21] Appl. No.: 71,554

[22] Filed: Jul. 8, 1987

Related U.S. Application Data

[63] Continuation of Ser. No. 912,168, Sep. 26, 1986, abandoned, which is a continuation of Ser. No. 567,340, Dec. 30, 1983, abandoned.

[51] Int. Cl.[4] ............................................. H02P 5/40
[52] U.S. Cl. ...................................... 318/809; 318/807
[58] Field of Search ................ 318/803, 807, 808, 809

[56] References Cited

U.S. PATENT DOCUMENTS

| | | | |
|---|---|---|---|
| 4,158,801 | 6/1979 | Hirata ................................... | 318/809 |
| 4,310,789 | 1/1982 | Akamatsu ........................... | 318/809 |
| 4,330,741 | 5/1982 | Nagase et al. ....................... | 318/808 |
| 4,437,051 | 3/1984 | Muto et al. .......................... | 318/811 |
| 4,447,771 | 5/1984 | Whited ................................ | 318/715 |
| 4,451,771 | 5/1984 | Nagase et al. ....................... | 318/800 |
| 4,456,868 | 6/1984 | Yamamura et al. ................ | 318/800 |
| 4,459,534 | 7/1984 | Nagase et al. ....................... | 318/808 |
| 4,499,414 | 2/1985 | Fujioka et al. ...................... | 318/803 |

Primary Examiner—David Smith, Jr.
Attorney, Agent, or Firm—Morgan & Finnegan

[57] ABSTRACT

A variable frequency AC induction motor servo control system wherein slip is momentarily increased in response to error signal transients. In a preferred embodiment, a phase shift is introduced in the energizing stator current as the servo velocity error signal increases over at least the lower portion of the error signal range, the maximum phase shift being between 45° and 90°.

11 Claims, 5 Drawing Sheets

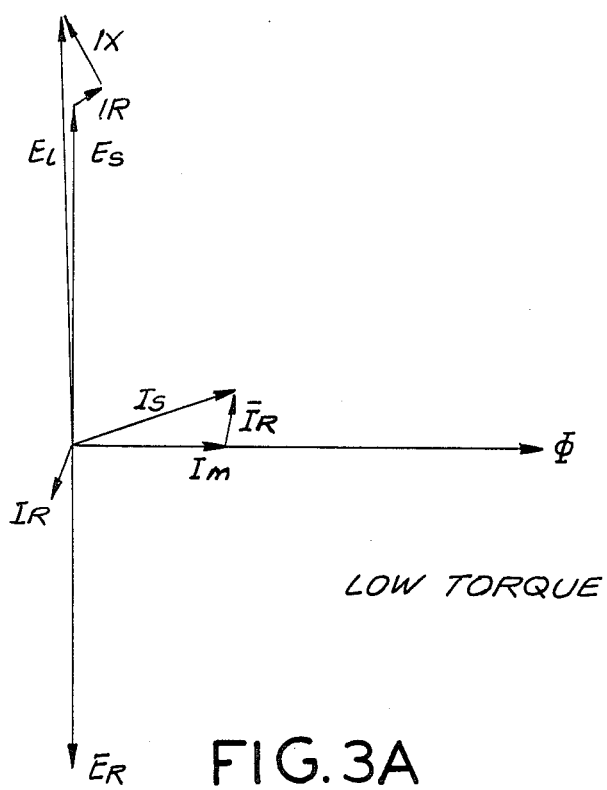
FIG. 3A LOW TORQUE
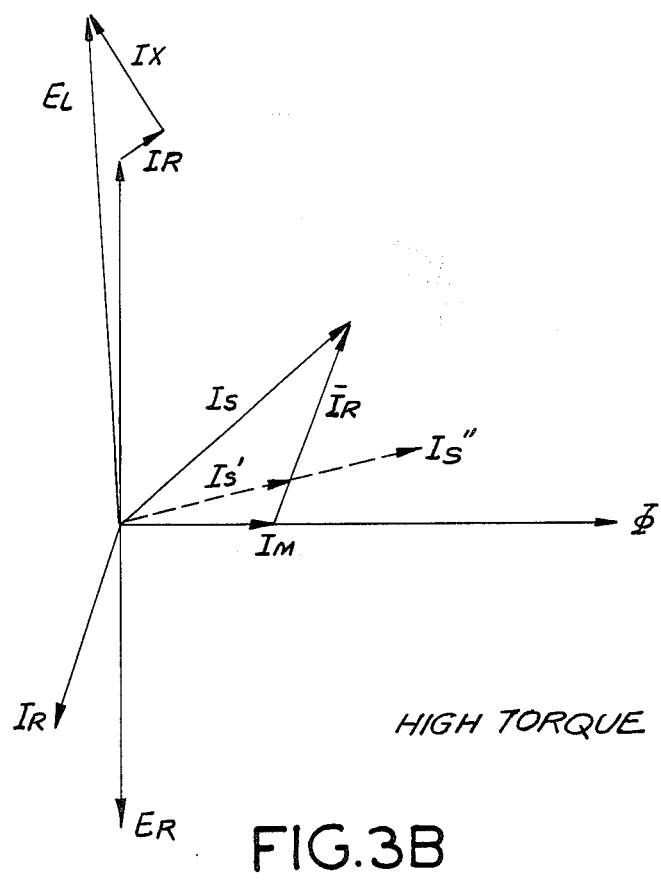
FIG. 3B HIGH TORQUE

CONTROL FOR IMPROVING INDUCTION TRANSIENT RESPONSE BY EXCITATION ANGLE CONTROL

This is a continuation of co-pending application Ser. No. 06/912,168, filed on 9/26/86, which is a continuation of application Ser. No. 567,340 filed on 12/30/86 now abandoned.

This invention relates to servo motor control systems, and more particularly, to servo control systems for controlling AC induction motors over a broad range of speeds and conditions.

BACKGROUND OF THE INVENTION

In applications where variable speed electric motors are required, DC motors are generally utilized because of the ability to accurately control such motors over a broad range of speeds and conditions. In DC motors the winding current controls the motor torque and can be directly measured to achieve accurate control and the desired operation.

In an AC induction motor the torque is a function of induced current in the rotor which in turn is a function of slip, i.e., the difference in speed between the rotor and the rotating magnetic field produced by the stator. The speed of the rotating magnetic field is determined by the frequency of the winding energizing current. However, due to the slip, the rotor speed will differ therefrom by a variable amount related to the torque demands on the motor. Accurate control of rotor speed of an AC induction motor is difficult to achieve under variable torque conditions. Thus, even though AC induction motors are considerably less expensive than DC motors, they have generally not been used where accurate speed control is required.

One prior approach to servo speed control of induction motors is the "vector control" approach described, for example, in U.S. Pat. Nos. 3,593,083 and 3,824,437. Servo control of the induction motor is achieved by sensing magnetic field conditions in the motor airgap or by deriving the field vector values from the stator voltage and current vectors. An inverter is then controlled in accordance with the filed vector values to supply an energizing signal to the motor having the desired phase, frequency and amplitude. Although this system functions well at running speed under load, this approach is characterized with poor control at low speeds and light loads. Under such conditions the magnetic fields in the motor are relatively weak or nonexistent and difficult to sense accurately. The calculated field vectors require integrations and therefore do not provide useful control informatin at zero speed. As a result, effective control based on these parameters cannot be achieved at low speeds. Furthermore, excessive power usage at low speeds results in undesirable heating.

Another approach is disclosed in patent application Ser. No. 297,809 filed Aug. 31, 1981 by James S. Whited now U.S. Pat. No. 4,559,485 wherein slip factors are empirically determined for a particular motor and these slip factors are utilized to generate a synthesized sine wave energizing signal having the slip and amplitude required to produce the torque necessary for achieving servo speed control. This approach eliminates the need for sensing the magnetic field vectors in the motor airgap and provides effective control under load at running speed. This system, however, tends to become unstable and oscillate at light loads. Also, the transient control response is less than desired to match DC motor performance.

An object of this invention is to provide a servo control system for controlling an induction motor which is capable of effectively controlling the motor over a range of conditions including zero speed and no load.

Another object is to provide such a system with improved transient control performance.

Still another object of the invention is to provide an AC induction motor servo control system capable of providing stiff control at stall, i.e., a control system capable of producing torque to resist movement from a stationary shaft position.

BRIEF SUMMARY OF THE INVENTION

According to the invention, effective induction motor servo control is achieved by introducing a momentary increase in slip in response to error signal transients, particularly at low speed light load control ranges. As a result, the control system according to the invention provides an induction motor control which is stiff when lightly loaded, i.e., the motor develops substantial torque to resist rotation from a stationary rotor position. The system also seems to anticipate torque demands during transient speed changes and is therefore capable of producing torque almost instantly when needed. When approaching desired steady state conditions, the system tends to anticipate and reduces or reverses torque to minimize overshoot.

In the preferred embodiment a phase shift is introduced in the energizing stator current which ircreases as the servo velocity error signal increases over at least the lower portion of the error signal range. Thus, increases in the magnitude of the servo error signal, indicating the need for increased torque, not only produce the normal increases in stator current and slip, but also produce a phase shift which, in effect, provides momentary additional slip. The effect is to produce an almost instantaneous torque boost to achieve a quick response to transient control shifts. Likewise, a reduction of the servo velocity error signal reduces the phase shift to momentarily reduce or reverse torque as steady state conditions are approached.

The maximum phase shift introduced is in the range between 45 and 90 degrees and preferably 90 degrees for maximum effectiveness. Under steady state, light load, conditions the stator current is almost in phase with the magnetizing current resulting in little torque generation. In attempting to respond to a torque demand, the system increases stator current and slip in response to the increased error signal, but little increase in torque is immediately achieved because of the almost in phase relationship of the stator current and magnetizing current. A higher torque, to satisfy transient conditions, is achieved with the invention by shifting the magnetizing current toward the quadrature position where higher motor torque can be generated.

The amount of momentary boost in the torque depends upon the slope of the phase shift characteristic. In order to achieve a relatively steep slope in the light load operating region, the phase is increased with increases of error signal only over the lower portion of the error signal range. For example, a phase shift can be zero degrees for zero error signal and increase to a maximum phase shift (e.g. 90 degrees) when the error signal reaches 25% of its maximum value. For most applications a phase shift characteristic wherein the maximum phase shift is achieved in the range between 10% and

BRIEF DESCRIPTION OF THE DRAWINGS

FIGS. 3A and 3B are vector diagrams for a typical induction motor under low and high torque conditions.

DETAILED DESCRIPTION

Figure 1:
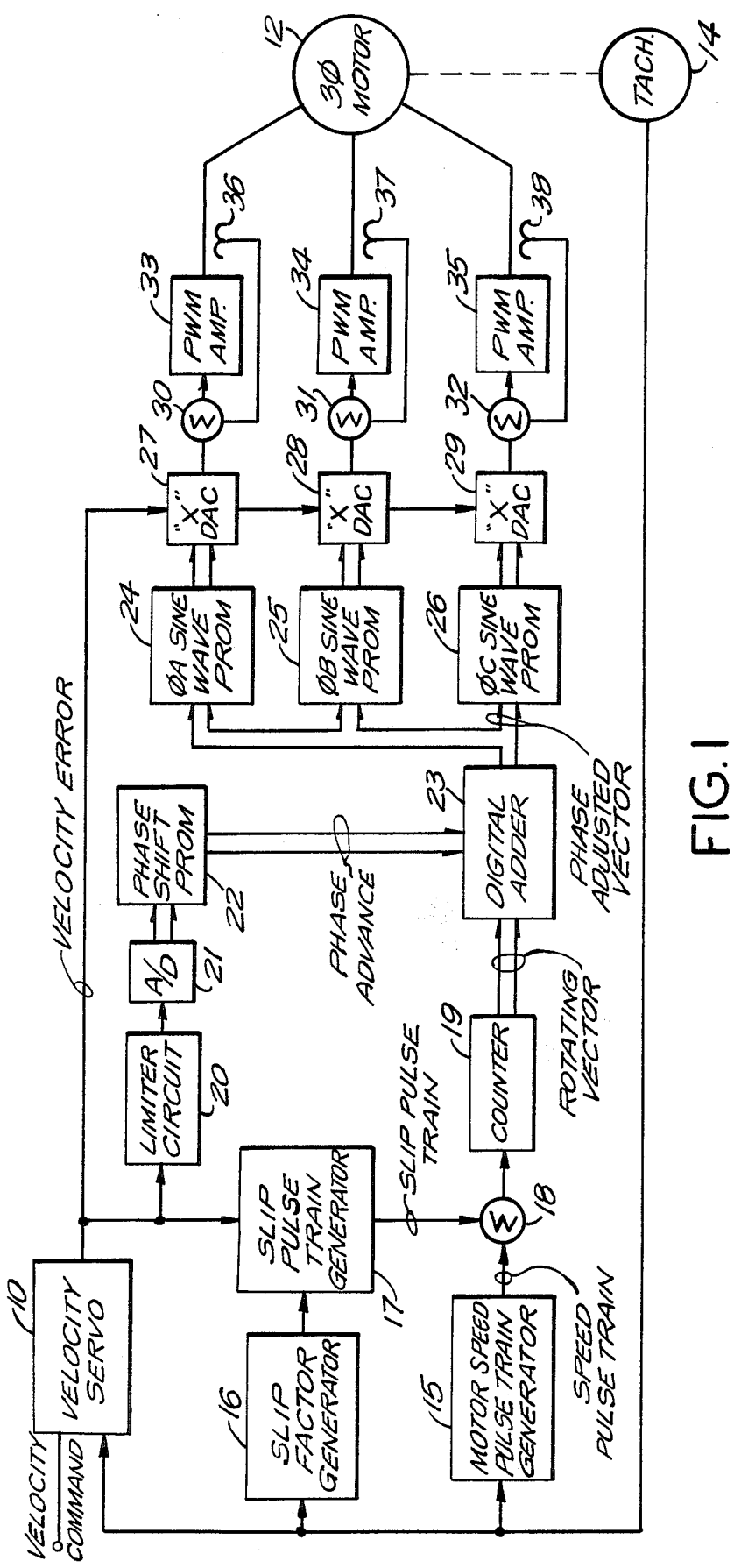
FIG. 1 is a block diagram of the overall system according to the invention.

FIG. 1 is a block diagram illustrating the overall system according to the invention for controlling a three-phase induction motor 12. A tachometer 14 is coupled to the motor shaft to provide a DC feedback proportional to rotor speed. The tachometer feedback is compared with a velocity command signal in a velocity servo 10 to provide a velocity error. The remainder of the system operates to energize the motor with a three-phase current having the correct amplitude and frequency for maintaining the speed dictated by the velocity command.

A motor speed pulse train generator 15 is responsive to the motor speed indication from tachometer 14 to provide a "speed pulse train" which is a serial pulse train wherein the pulse rate is proportional to rotor speed. In its simplest form, pulse generator 15 could be a voltage controlled oscillator (VCO) which produces output pulses at a rate proportional to the magnitude of the applied voltage.

Circuits 16 and 17 generate a second serial pulse train referred to as the "slip pulse train." Slip factor generator 16 receives the signal from tachometer 14 and has slip factors stored therein to produce a slip factor signal which varies in accordance with speed. The slip factors are preferably determined empirically from the motor being controlled and vary as a function of speed. In most cases the slip factors increase linearly as a function of speed and correspond to values that produce maximum torque.

The slip factors are multiplied by a value proportional to the torque demand and the resulting product is then converted into the "slip pulse train" having a pulse repetition rate proportional to slip. The torque produced by the motor increases with stator current and, hence, the stator current could be used to control slip generator 17. In simpler systems, however, where the stator current is proportional to the velocity error, the velocity error can be used directly to control slip pulse generator 17 as shown in FIG. 1.

The "speed pulse train" and the "slip pulse train" are combined in a pulse summing circuit 18. The number of pulses per second in the combined pulse train is either more or less than the number of pulses per second in the speed pulse train, the difference being the number of pulses per second in a slip pulse train. The combined pulse train is supplied to a counter 19 which converts the pulse train into a digital parallel format indicating vector position. If the counter is a typical 8 bit counter, then the counter output can indicate 256 different vector positions, i.e., the output would change from zero to 255 and then repeat.

The velocity error signal from the output of velocity servo 10 is supplied to an analog to digital (A/D) converter 21 via a limiter circuit 20. The digital output from converter 21 is supplied as the address input to a PROM 22 having phase shift numbers stored therein. The digital output of PROM 22 is supplied to a digital adder circuit 23 where it is added to (or subtracted from) the digital output of circuit 19 representing the rotating vector. The output of adder 23 is a digital vector position indication adjusted in phase according to the phase advance supplied from PROM 23. The phase advance is a function of the velocity error as will be described hereafter in more detail.

The phase adjusted vector output from adder 23 is supplied as the address input to PROMS 24-26 which tave digital sine values stored therein. These PROMS convert the digital vector position data into sine wave amplitude values. The sine values stored in the PROMS differ by 120 and 240 degrees so that the outputs of PROMS 24-26 have a three-phase displacement. The outputs of PROMS 24-26 pass through multiplying DAC's (digital to analog converters) 27-29, respectively, to provide analog sine waves. The velocity error signal from velocity servo 10 is supplied to each of the multiplying DAC's so that the amplitude of the sine wave outputs vary in accordance with the magnitude of the velocity error. Thus, the output of the DAC's 27-29 is a three-phase analog voltage signal having an amplitude proportional to the velocity error.

The voltage signal appearing at the output of the DAC's is then converted to a motor excitation current by PWM (pulse width modulation) amplifiers 33-35. Current sensors 36-38 sense the current magnitudes being supplied to motor 12 and provide corresponding feedback voltages to summing junctions 30-32. The feedback voltages are compared to the voltage outputs from DAC's 27-29 to derive an error signal which drives the PWM amplifiers to produce excitation currents for the motor corresponding to the voltage signals appearing at the outputs of DAC's 27-29.

In operation, tachometer 14 produces a velocity feedback representative of the actual motor speed which is compared to the velocity command in velocity circuit 10. The servo circuit produces a velocity error signal which, in essence, represents a torque demand as required to adjust the motor speed in accordance with the velocity command.

The magnitude of the three-phase excitation current supplied to the motor is adjusted in accordance with the torque demand through the action of the multiplying DAC's 27-29. The slip is also adjusted in accordance with the torque demand as a result of summing the speed pulse train and slip pulse train in a summing circuit 18 to derive a rotating vector used in controlling the frequency and phase of the excitation current.

The rotating vector is further phase adjusted according to this invention by adding a phase advance to the rotating vector which phase advance is a function of the velocity error or torque demand. The phase shift increases as velocity error increases and advances the rotating vector accordingly. The phase shift is polarity sensitive and therefore is a leading phase shift for a positive velocity error and a lagging phase shift for a negative velocity error. The phase shift is zero for a zero velocity error and increases as the velocity error increases in magnitude.

The phase advance provides several complementary, beneficial results. First, the phase advance introduces a momentary change in slip during transient torque demand conditions. For example, a change in the velocity command brings about an increase in the velocity error signal which attempts to produce a torque by automatically increasing the stator current and the slip in proportion to the velocity error. In addition, the increase in the velocity error signal also results in a phase shift of the rotating vector which is, in effect, a further momemtary increase in slip during the period while the vector phase changes. Likewise, when the system approaches the speed corresponding to the velocity command, the velocity error decreases toward zero reducing the phase advance thereby resulting in a momentary negative slip. Thus, the effect of the phase shift is to give an instantaneous boost to the slip when needed to produce torque for a quick response to a change in the velocity error and to reduce or reverse slip when the velocity error signal approaches zero or reverses polarity, respectively.

Another effect of the phase advance is to shift the stator current phase to a position where it more effectively produces torque or the proper polarity in response to a torque demand. FIGS. 3A and 3B are vector diagrams for a typical induction motor operating under low torque and high torque conditions, respectively. In the diagrams the vector $\phi$, representing the rotating magnetic field vector, is used as the reference. The rotating field is produced by a magnetizing current $I_m$ which is substantially in phase with the field vector. The rotating magnetic field cuts the rotor and stator conductors and produces the voltages $E_R$ and $E_S$, respectively. A rotor current $I_R$ is induced in the rotor and lags the rotor voltage due to the rotor leakage inductance. The stator current $I_S$ supplies the magnetizing current $I_m$ and the rotor current $I_R$ (i.e. rotor current $I_R$ transformed to the stator).

As can be seen by comparison of FIGS. 3A and 3B, an increase in torque corresponds to increases in the magnitude of the stator current $I_S$ and a shift in the phase of the stator current. In FIG. 3B the dotted line vector $I'_S$ has been added representing the stator current for the low torque condition in FIG. 3A. If the system is operating under low torque conditions (stator current $I'_S$ in FIG. 3B) when an increased torque demand is received, the system increases the stator current and slip. If there is no phase advance, however, the effect is to immediately increase the stator current (stator current $I''_S$ in FIG. 3B), which is of the correct magnitude but not the correct phase for effective torque production. In time the system would adjust to the correct phase. With the system according to the invention, however, the increase in velocity error provides a phase shift in addition to the increase in stator current and slip resulting in a stator current more nearly located at the correct phase position for effective torque production. As a result of the phase advance, the system provides a larger immediate torque in response to a torque demand.

In systems without the phase advance, situations have been observed where, in changing speed, the system may not correct for overshoot, apparently due to incorrect alignment of the rotor and stator field vectors under these conditions. With the phase advance, however, the system not only provides the correct torque direction for correcting velocity overshoot, but also tends to anticipate and reverse torque slightly ahead of polarity reversals in the error signal. As a result, the system more quickly adjusts to the new speed requested by a velocity command.

Figure 2:
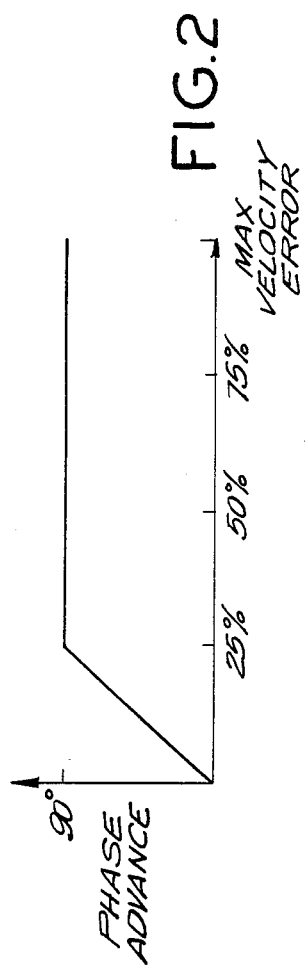
FIG. 2 is a diagram illustrating the preferred phase advance characteristic.

Although the phase advance could extend over the entire velocity error range, good results are achieved by concentrating the phase shift in the lower velocity error region as shown in FIG. 2. Good results are achieved by advancing to a maximum phase shift between 15% and 50% of maximum error signal, preferably 25%. If the system operates on a 10V error signal (from $+10$ V to $-10$V) the characteristic shown in FIG. 2 is achieved by setting limiter 20 (FIG. 1) at 2.5V. With this arrangement, as the velocity error increases from zero to 2.5V, the phase shift advances from zero to the maximum value, e.g., 90 degrees. Further increases in the velocity error beyond 2.5V do not result in further advances of the phase angle. For negative velocity error values, the phase shift advances from zero to minus 90 degrees as the error signal increases from zero to $-2.5$V.

The momentary increase in slip resulting from a change in velocity error is a function of the slope of the phase shift characteristic. By concentrating the phase shift in the lower velocity error region a steeper slope is achieved and, hence, a greater momentary slip change is achieved where most needed. The system responds well to control changes with moderate to heavy loads without the phase advance feature. The phase advance is therefore preferably concentrated in the low velocity error region corresponding to low speed, light load operations.

The maximum phase shift to be used may vary depending on the particular installation. A maximum phase shift in the region between 45 degrees and 90 degrees is effective. For most installations, a maximum phase shift of 90 degrees is preferred.

Figure 4:
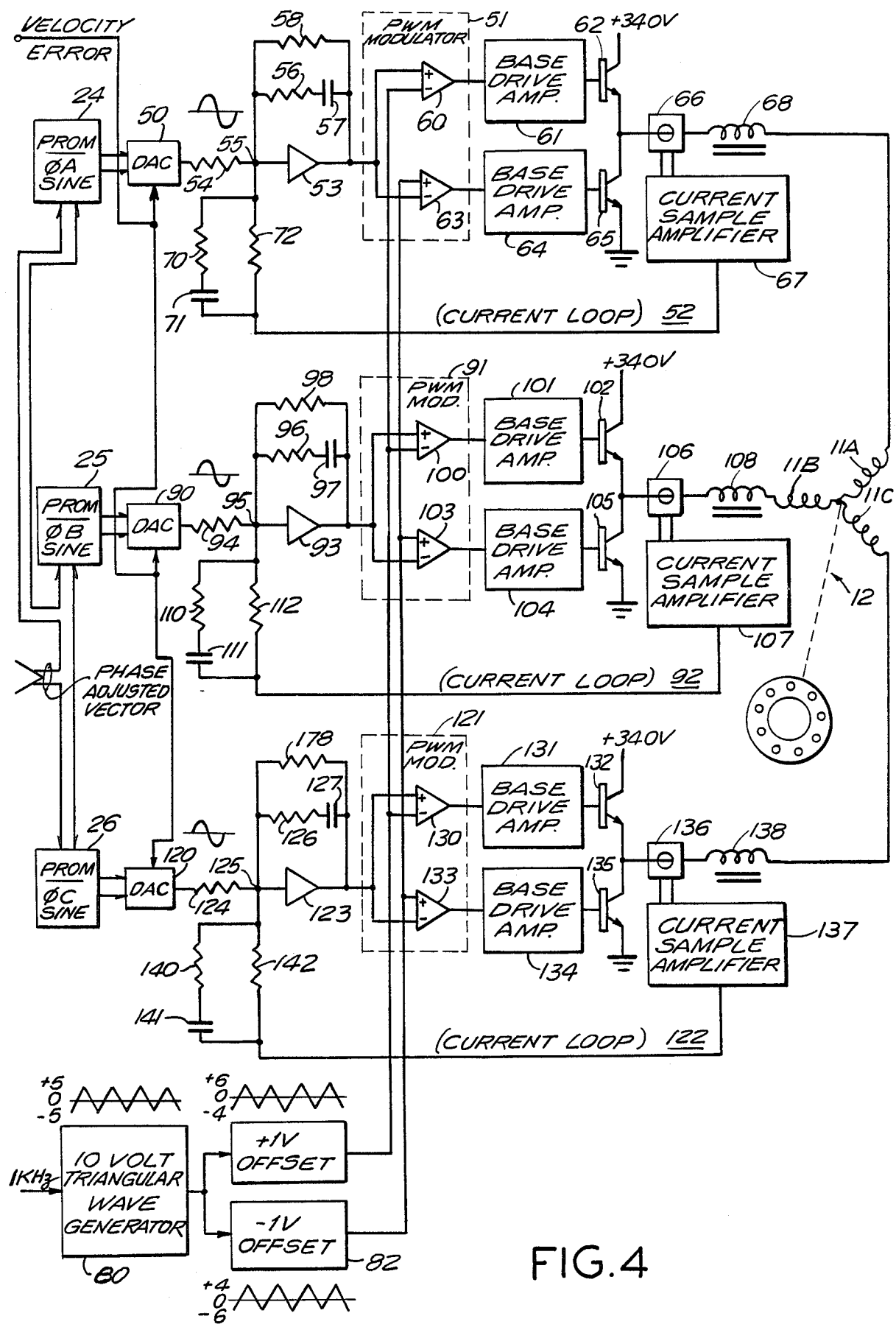
FIG. 4 is a more detailed schematic block diagram of the drive circuits used in producing three phase excitation currents for the induction motor.

FIG. 4 is a more detailed schematic block diagram of the portion of the system which converts the phase adjusted rotating vector into a three-phase excitation current for the motor, i.e., components 24–38 in FIG. 1.

The drive circuits shown in FIG. 4 provide the excitation currents for windings 11A, 11B and 11C which are sinusoidal and displaced from one another by 120 electrical degrees. The frequency is determined by the "phase adjusted vector" indication and the amplitude is determined by the "velocity error".

As previously mentioned, the vector indication is converted into sine wave values by programmable read only memories (PROM's) 24, 25 and 26 which are programmed to receive vector position values as addresses and to produce corresponding sine values. The PROM's are programmed so that in response to any particular vector indication they produce sine values displaced from one another by 120 and 240 electrical degrees.

The digital output indications from PROMs 24, 25 and 26 are supplied, respectively, to digital to analog converters (DACs) 50, 90 and 120 which convert the digital values stored in the PROMs into analog values, i.e., sine waves. DACs 50, 90 and 120 are of the analog multiplying type capable of multiplying the output with another analog signal. The velocity error signal is supplied to the DACs and controls the amplitude of the sine wave signals produced.

The result appearing at the outputs of DACs 50, 90 and 120 is three incrementally synthesized sine wave voltage signals displaced from one another by 120 electrical degrees, having a frequency differing from the synchronous frequency by the amount of the slip and having an amplitude controlled by velocity error in the velocity servo loop.

The sinusoidal voltage signal appearing at the output of DAC 50 is supplied to a pulse width modulator 51 which provides pulse width current excitation to winding llA of the motor. The quantity of current supplied to the winding is proportional to the applied voltage and is controlled by current loop 52.

The output of DAC 50 is connected to th input of an operational amplifier 53 via a resistor 54 and a summing junction 55. A lead network consisting of the series combination of resistor 56 and capacitor 57 in parallel with a resistor 58 is connected across the operation amplifier. The amplifier output is connected to the negative input terminal of a comparator 60 and to the positive input terminal of a comparator 63. The output of comparator 60 is coupled to the base of a transistor 62 via a base drive amplifier 61. The output of comparator 63 as coupled to the base of transistor 65 via a base drive amplifier 64.

Transisitors 62 and 63 are both NPN power switching transistors selected to handle the current requirements for the motor being controlled. The collector of transistor 62 is connected to the +340 volt supply bus, while the emitter thereof is connected to winding 11A through an inductor 68. The collector of transistor 65 is also connected to winding 11A through inductor 68 while the emitter of transistor 65 is connected to ground. Thus, when the transistor 62 is conductive, winding llA is connected to the positive supply bus whereas when transistor 65 is conductive, the winding is connected to ground. The inductor in series with the motor winding decreases ripple currects and associated motor heating.

The common lead from transistors 62 and 65 to inductor 68 passes through a ferrite core 66 having a linear Hall effect detector located to sense the magnetic flux in the core. The Hall detector is connected to a current sample amplifier 67. As current passes through the conductor, it creates a magnetic flux in core 66 which is sensed by the Hall detector connected to amplifier 67 which in turn prooduces a voltage output proportional to the current passing through the lead.

The output of amplifier 67 provides the feedback to summing junction 55 to complete the current control loop. More specifically, the output of amplifier 67 is connected to summing junction 55 via a lead network, including the series combination of resistor 70 and capacitor 71 in parallel with a resistor 72. The lead networks 70-72 and 56-58 tend to anticipate rapid signal changes and reduce overshoot and ringing in the control loop. The current loop is an inner control loop within the velocity control loop and the vector control loop and therefore the current loop is preferably designed with a relatively broad band characteristic to provide a more rapid control response.

The pulse width modulator (PWM) 51 which includes comparators 60 and 63 receives triangular wave signals originating from a triangular wave generator 80. The triangular wave has a suitably high repetition rate like 1 KHz and has a peak-to-peak range from +5 volts to −5 volts. The triangular wave from generator 80 is offset by +1 volt in an offset circuit 81 to provide a triangular wave having a peak-to-peak range of +6 volts to −4 volts which is supplied to the negative input terminal of comparator 63. The triangular wave from generator 80 also passes through −1 volt offset circuit 82 to provide a triangular wave with peak-to-peak values ranging from +4 volts to −6 volts supplied to the positive input terminal of comparator 60.

Figure 4A:
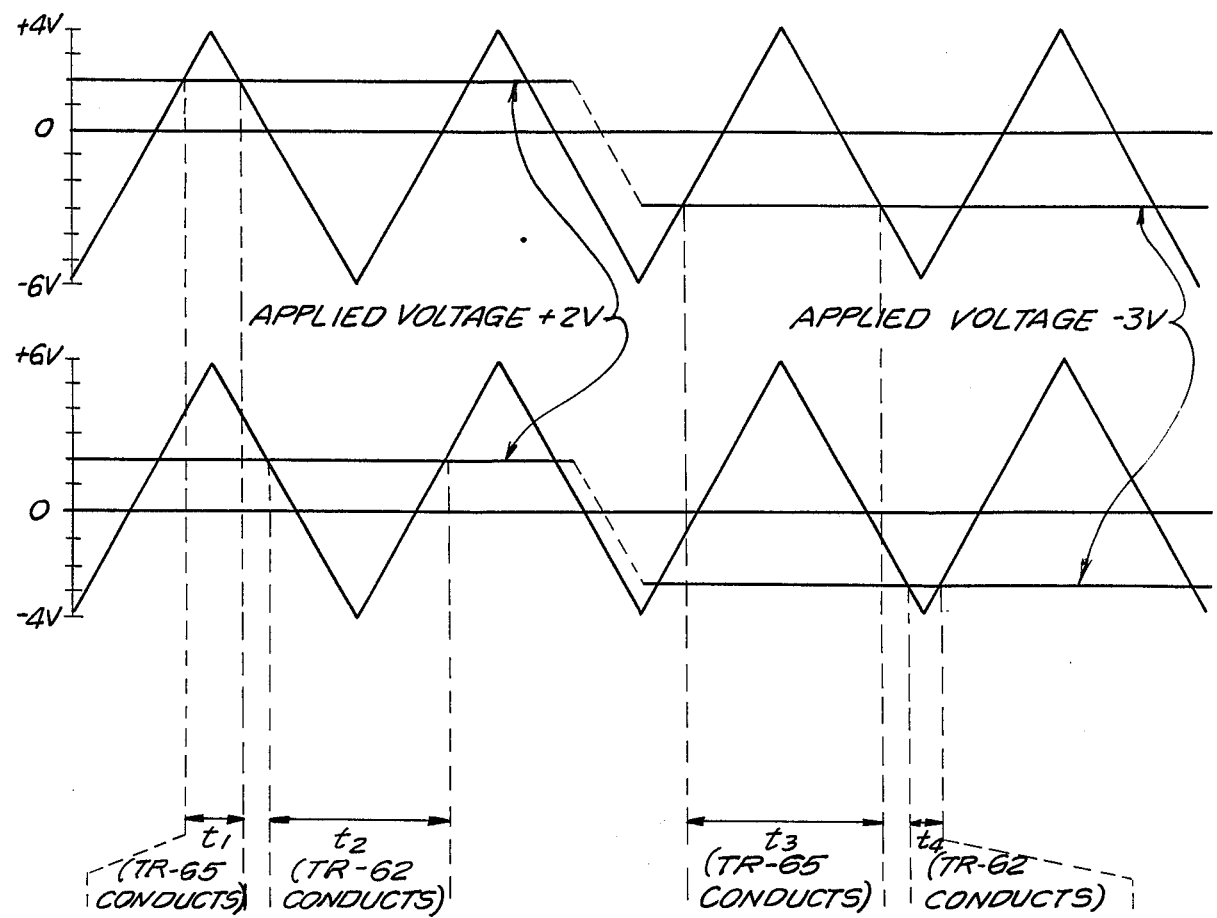
FIG. 4A is a series of diagrams illustrating the pulse width modulation utilized in FIG. 4.

The operation of the pulse width modulator is illustrated in FIG. 4A showing the two offset triangular waves applied to comparators 60 and 63. If the applied signal (output of amplifier 53 in FIG. 4) has a +2 volts value, for example as shown to the left in FIG. 4A, comparator 63 produces a logic 1 signal for the interval $t_1$ during which the applied signal is more negative than the triangular wave. Transistor 65 is therfore conductive during interval $t_1$. During the remainder of the triangular wave cycle the comparator produces a logic 0 output and therefore transistor 65 is nonconductive. Comparator 60, on the other hand, produces a logic 1 signal during $t_2$ when the applied signal is more positive than the triangular wave to thereby render transistor 62 conductive. During the remainder of the cycle transistor 62 is nonconductive since the applied signal is more positive than the triangular wave signal.

Another example is shown to the right in FIG. 4A where the applied signal has a value of −3 volts. Under these circumstances, comparator 63 produces a logic 1 output to render transistor 65 conductive during interval $t_3$ whereas comparator 60 produces a logic 1 signal during interval $t_4$ during which time transistor 62 is rendered conductive.

Thus, it can be seen that as the applied signal becomes increasingly positive transistor 62, which connects the winding to the positive source, becomes conductive for increasingly longer portions of each operating cycle whereas transistor 65, which connects the winding to ground, becomes conductive for increasingly shorter intervals. Accordingly, increasingly positive applied voltages cause increasingly larger currents to flow through the winding. On the other hand, as the applied signal becomes increasingly negative, the conductive period for transistor 65 increases and the conductive period for transistor 62 decreases. Accordingly, periods of time and, therefore, the current flow through the winding decreases.

It should be noted in FIG. 4A that an interval always exists between the times when the two transistors are conductive. This interval is as a result of the voltage offsets provided by circuits 81 and 82. The interval provides a short dead space to insure tnat both transistors never become conductive simultaneously to short circuit the power supply.

The current supplied to the winding is controlled by current loop 52 so that the current is proportional to the applied potential appearing at the output of DAC 50. As the output of DAC 50 increases, the output of amplifier 53 tends to increase thereby increasing the conductive interval for transistor 62 and the current supplied to the winding. The increase in current is detected by amplifier 67 which provides an increased feedback signal to amplifier 53 to limit the increase to the value indicated by the applied potential.

Similarly, components 91-112 form a current control loop that applies current to winding llB proportional to the synthesized sinusoidal voltage appearing at the output of DAC 90 and components 121-142 from a current control loop that applies curent to winding llC proportional to the synthesized sinusoidal voltage appearing at the output of DAC 120.

The three phase drive currents when applied to the windings of the motor create a rotating magnetic which rotates at a speed and phase determined by the phase adjusted rotating vector. The stator current is controlled by the velocity error.

Figure 5:
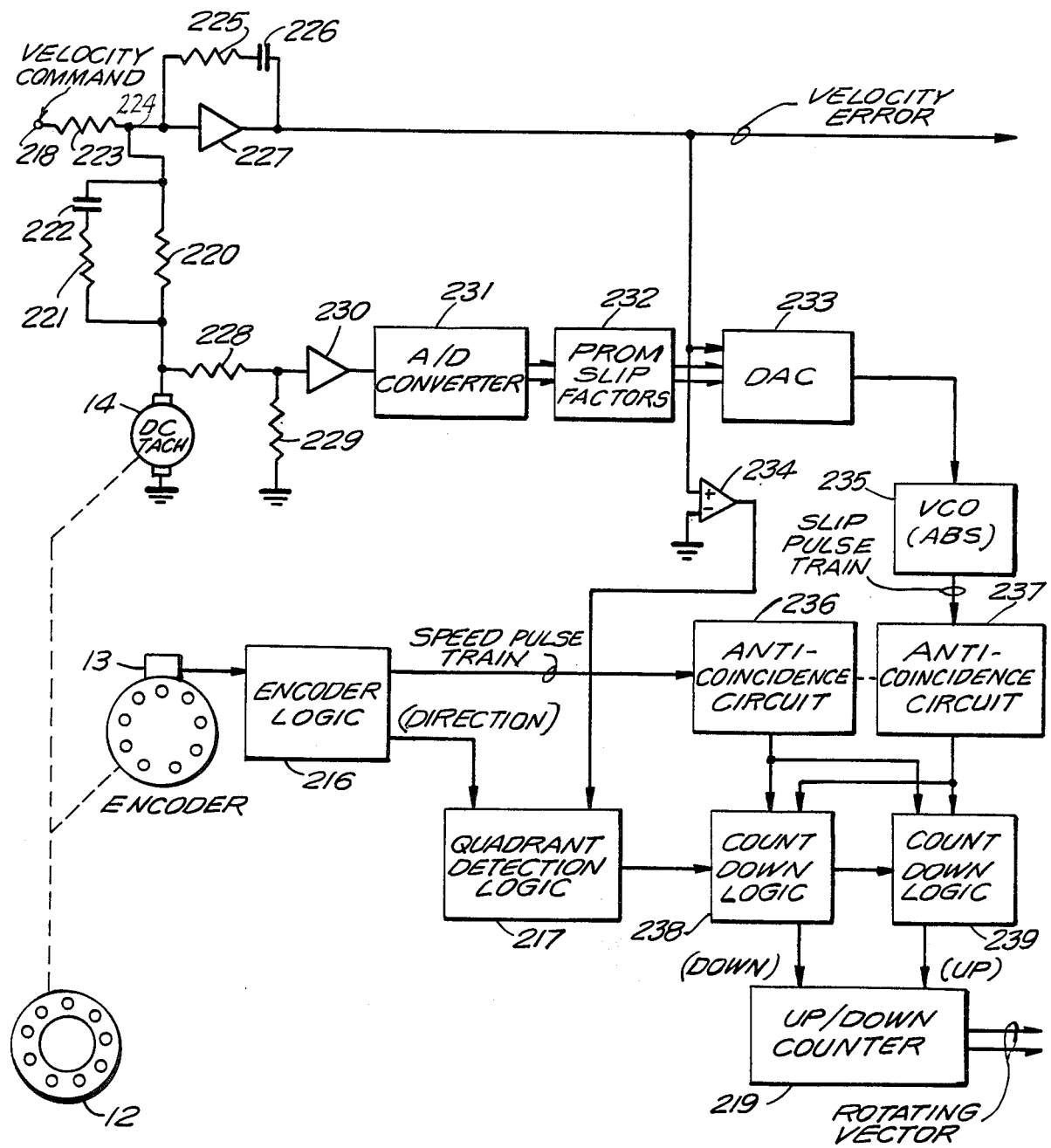
FIG. 5 is a more detailed schematic block diagram illustrating circuits for developing a "a speed pulse train", a "slip pulse train" and the "rotating vector" therefrom.

FIG. 5 is a schematic block diagram illustrating a preferred arrangement for generating and combining the "speed pulse train" and the "slip pulse train" to achieve the "rotating vector." In FIG. 4, the speed pulse train is derived from a digital encoder rather than from the DC tachometer (as in FIG. 1) in order to achieve greater accuracy. The rotor of motor 12 is shown to the left in FIG. 5 mechanically coupled to DC tachometer 14 and an encoder 13. The DC tachometer can be of conventional design to provide a DC voltage proportional to rotor speed with a polarity indicative of direction. The encoder provides pulses indicative of incremental rotor movements.

The servo circuit for producing the "velocity error" signal includes an operational amplifier 227. One brush of DC tachometer 14 is connected to ground whereas the other brush is connected to the input of amplifier 227 at summing junction 224 via a lead network consisting of the series combination of resistor 221 and capacitor 222 in parallel with resistor 220. Terminal 218 receives the velocity command in the form of an analog voltage having an amplitude indicating desired motor speed and a polarity indicating desired direction. Terminal 218 is connected to the input of amplifier 227 via a resistor 223 and summing junction 224. A lead network consisting of resistor 225 in series with capacitor 226 is connected across amplifier 227. The lead networks including components 220-222 and 225-226 tend to anticipate rapid changes in the feedback loop and reduce overshoot and ringing.

The tachometer acts as a feed back element providing a continuous indication of the actual motor speed and direction. Amplifier 227 and the related components form a summing circuit which sums the actual speed and direction signal from the tachometer with the desired speed and direction as indicated by the command signal at terminal 218 to produce the difference at the output of the amplifier 227 which is referred to as the "velocity error" signal. As previously explained, the velocity error signal controls the amplitude of the motor excitation current. The speed of the motor is automatically adjusted in servo loop fashion until the actual motor speed is essentially the same as the desired speed indicated by the velocity command.

Encoder 13 is of conventional design and is connected to an encoder logic circuit 216 that produces a "speed pulse train," with "n" pulses per revolution of the motor, and a direction indication of the motor rotation. The sinusoidal excitation currents are synthesized from pre-recorded values in a read only memory (PROMs 24-26 FIG. 1) which conventionally uses an 8 bit address and therefore record 256 values. If, the motor is a four pole motor, 180 mechanical degrees is equal to 360 electrical degrees and therefore the speed pulse train should include 512 pulses per revolution. In general, "n" is equal to 256 times the number of pole pairs.

If the base pulse train were used directly to control the drive circuits, the drive circuits would produce excitation current synchronous with the rotor movement. To adjust the excitation frequency for the induction motor, a slip pulse train is generated utilizing slip factors recorded in programmable read only memory (PROM) 232.

More specifically, resistors 228 and 229 form a voltage divider across DC tachometer 14 to scale the tachometer output for application to a buffer amplifier 230. The output of amplifier 230 is supplied to a digital to analog converter 231 which in turn supplies a digital output to PROM (232). The output of converter 231 is an 8 bit word indicating motor speed and is used as the address for PROM 232. Thus, the output of PROM 232 is a slip factor selected as a function of motor speed.

The slip factors are preferably determined empirically by determining the numerical factors at each speed that produce the greatest torque. This can be done by maintaining the motor at a constant speed while changing the numerical values applied to DAC 233 until the value corresponding to the maximum torque is found.

If, for example, voltage controlled oscillator 235 produces the maximum desired slip frequency for the maximum motor speed in response to a 10 volt signal and the maximum velocity error signal is 10 volts, then the slip factor in PROM 232 corresponding to the maximum speed should be 1.000. A typical corresponding value for zero speed would be 0.200. The values between these extremes can change linearly with speed to achieve the desired control results.

The digital output from PROM 232 is supplied to a digital to analog converter 233 which converts the digital indication into a corresponding voltage. Converter 233 is of the type capable of multiplying the output by another analog signal which, in this case, is supplied from the output of amplifier 227. Therefore, the output of converter 233 represents the selected slip factor multiplied by the velocity error. This output from converter 233 is supplied to a voltage controlled oscillator 235 which produces a "slip pulse train" having a repetition rate proportional to the absolute value of the applied voltage.

The two pulse trains, i.e., the base pulse train developed from encoder 13 and the slip pulse train developed by oscillator 235, are supplied to a counter 219 which produces the "rotating vector" indication. More specifically the speed pulse train from encoder logic 216 passes through an anti-coincidence circuit 236 into a count-down logic circuit 238 and a count-up logic circuit 239. The logic circuits contain suitable gates controlled by a quadrant detection logic circuit 217 which channels the base pulse train into either the "down" count input of counter 219 or into the "up" count input of the counter. Similarly, the slip pulse train from oscillator 235 passes through an anti-coincidence circuit 237 into count down logic circuit 238 and count up logic circuit 239. The logic circuits likewise channel the slip pulse train into one or the other of the counter inputs.

Anti-coincidence circuits 236 and 237 are interconnected as indicated by the dotted line connection in FIG. 5. These circuits function to make sure that pulses are not lost when pulses arrive simultaneously in both pulse trains. The anti-coincidence circuits alternately pass applied pulses so that the pulse from one pulse train, if present, will pass and then a pulse from the other pulse train, if present, will pass. In this manner, the loss of pulses is prevented when the pulses occur simultaneously, The count down and count up logic circuits are controlled by quadrant detection logic circuit 217, which receives a signal from encoder 216 indicating the actual direction of rotor movement and also receives a signal derived from the velocity error which indicates the desired torque direction. The velocity error indicates the quantity and direction of the torque required for the motor. The output of amplifer 227 is supplied to the plus input of a comparator 234, the minus input being connected to ground. The output of comparator 234 is connected to the quadrant detection logic circuit 217 and supplies a logic signal indicating the polarity of the velocity error which is the direction of the desired torque.

A truth table for the direction information and the resulting paths for the slip pulse train and the speed pulse train is as follows:

| Motor Direction | Torque Direction | Slip Pulses | Speed Pulses |
|---|---|---|---|
| 1 | 1 | Up Count | Up Count |
| 0 | 0 | Down Count | Down Count |
| 0 | 1 | Up Count | Down Count |
| 1 | 0 | Down Count | Up Count |

If the rotor direction and the torque direction both correspond to a logic 1 (first line of table), then the slip pulse train from oscillator 235 and the speed pulse train from encoder 15 both pass through count up logic circuit 239 to the "up" count input of counter 219. If the motor rotation and the torque direction both correspond to a logic 0 (second line of the table), then both pulse trains pass through the count down logic circuit 238 into the "down" input of counter 219. Thus, if the actual motor direction is the same as the desired torque direction, the pulse trains add (i.e., cause the counter to count in the same direction) and, hence, the counter passes through a complete cycle (236 bits) faster than if only the speed pulse train had been applied.

If the motor direction corresponds to a logic 0 and the torque direction corresponds to a logic 1 (third line of the table), then the slip pulse train passes throught count up logic circuit 239 into the "up" counter input while the speed pulse train passes through count down logic 238 into the "down" counter input. Similarly, if the motor direction corresponds to logic 1 and the torque direction corresponds to logic 0 (last line in table), the slip pulse train passes through to the "down" counter input whereas the speed pulse train passes through the "up" counter input. When the actual motor direction is different from the desired torque direction (as can occur during a speed change or a direction change) the pulse trains subtract from one another and the count cycle of the counter is slower than if only the speed pulse train were applied.

The output of the counter 219 is an 8 bit word indicating the "rotating vector" and is supplied to digital adder circuit 23 (FIG. 1) where it is combined with the "phase advance" to derive the "phase adjusted vector".

While only a few illustrative embodiments have been described in detail, it should be obvious that there are other embodiments within the scope of this invention. The invention is more particularly defined in the appended claims.

We claim:

1. In a servo control system for an AC induction motor of the type including
   a. a servo loop providing an error signal,
   b. a digital rotating vector indication with a rotational speed differing from the actual motor speed according to the desired slip, and
   c. conversion of said rotating vector into motor excitation current having a frequency and phase according to said rotating vector and a magnitude proportional to said error signal,
the improvement comprising:
   a phase advance circuit providing a phase shift indication which increases as a function of said error signal including
      circuit means in said phase advance circuit for advancing said phase shift indication to a maximum phase shift indication value when said error signal is in the range of 15% to 50% of maximum error signal, and
   circuit means for shifting the phase of said rotating vector in accordance with said phase shift indication.

2. A servo control system according to claim 1 wherein said circuit means in said phase advance circuit reaches said maximum phase shift indication value when said error signal reaches about 25% of maximum value.

3. A servo control system according to claim 2 wherein said phase advance circuit means further includes second circuit means for limiting said maximum phase shift indication to a value in the range of 45 degrees to 90 degrees.

4. A servo control system according to claim 3 wherein said maximum phase shift indication of said second circuit means is about 90 degrees.

5. In a servo control system for an AC induction motor comprising:
   an induction motor;
   excitation circuit means providing a polyphase excitation current for said motor;
   a speed sensor for sensing the rotational speed of said motor;
   a servo loop connected to said speed sensor and said excitation circuit means for comparing actual motor speed to desired motor speed to derive an error signal for control of the excitation current magnitude;
   rotating vector generation means for generating a rotating vector
      having a rotational speed differing from the actual motor speed according to slip, and being connected to said excitation circuit means to control the frequency and phase of said excitation current;
   a phase advance circuit providing a phase shift indication which increases as a function of said error signal,
      said phase advance circuit including circuit means for advancing said phase shift indication to a maximum phase shift indication value when said error signal is in the range of 15% to 50% of the maximum error signal, and
   circuit means for shifting the phase of said rotating vector in accordance with said phase shift indication.

6. A servo control system according to claim 5 wherein said circuit means in said phase advance circuit reaches said maximum phase shift indication value when said error signal reaches about 25% of maximum value.

7. A servo control system according to claim 5 wherein said phase advance circuit means includes circuit means for limiting said maximum phase shift indication to a value in the range of 45 degrees to 90 degrees.

8. A servo control system according to claim 7 wherein said maximum phase shift indication is about 90 degrees.

9. The servo control system according to claim 5 wherein said rotating vector generation means includes:
   a motor speed pulse train generator for providing a pulse train having a pulse repetition rate corresponding to the actual speed of said motor,
   a slip pulse train generator for providing a pulse train according to slip and
   a summation circuit for combining said pulse trains.

10. The servo control system according to claim 9 wherein said rotating vector generation means further comprises a counter responsive to said combined pulse trains to provide a corresponding digital rotating vector indication.

11. The servo control system according to claim 5 wherein said excitation circuit means includes
   sine value generation means for providing sine values according to said rotating vector position, and
   current control circuits for providing excitation current to said motor in accordance with said sine values.

* * * * *